(12) United States Patent
Guo et al.

(10) Patent No.: US 9,077,749 B2
(45) Date of Patent: Jul. 7, 2015

(54) IDENTITY VERIFICATION FOR AT LEAST ONE PARTY TO A TEXT-BASED COMMUNICATION

(75) Inventors: Shang Q. Guo, Courtland Manor, NY (US); Jonathan Lenchner, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/362,487

(22) Filed: Jan. 31, 2012

(65) Prior Publication Data

US 2013/0198860 A1 Aug. 1, 2013

(51) Int. Cl.
*H04L 29/06* (2006.01)
*G06F 21/31* (2013.01)
*G06F 21/55* (2013.01)
*H04L 12/58* (2006.01)

(52) U.S. Cl.
CPC .......... *H04L 63/1483* (2013.01); *G06F 21/316* (2013.01); *G06F 21/554* (2013.01); *H04L 63/1441* (2013.01); *H04L 51/04* (2013.01)

(58) Field of Classification Search
None
See application file for complete search history.

(56) References Cited

U.S. PATENT DOCUMENTS

| 4,393,269 | A | * | 7/1983 | Konheim et al. | 705/75 |
| 4,649,233 | A | * | 3/1987 | Bass et al. | 713/171 |
| 6,442,692 | B1 | | 8/2002 | Zilberman | |
| 7,209,954 | B1 | | 4/2007 | Rothwell et al. | |
| 7,689,418 | B2 | * | 3/2010 | Ramaswamy et al. | 704/250 |
| 7,689,658 | B2 | | 3/2010 | Codignotto | |
| 7,992,194 | B2 | * | 8/2011 | Damodaran et al. | 726/4 |
| 2005/0210102 | A1 | | 9/2005 | Johnson et al. | |
| 2007/0086592 | A1 | | 4/2007 | Ellison et al. | |
| 2007/0156836 | A1 | | 7/2007 | Kelso et al. | |
| 2008/0133672 | A1 | | 6/2008 | Gillum | |
| 2008/0134336 | A1 | | 6/2008 | Rihn et al. | |
| 2008/0222712 | A1 | * | 9/2008 | O'Connell et al. | 726/7 |
| 2009/0019118 | A1 | | 1/2009 | Jones et al. | |
| 2009/0106379 | A1 | | 4/2009 | Kirkland | |
| 2009/0320123 | A1 | * | 12/2009 | Yu et al. | 726/16 |
| 2010/0064345 | A1 | | 3/2010 | Bentley et al. | |

(Continued)

FOREIGN PATENT DOCUMENTS

WO WO 2005121991 12/2005
WO 2007/094772 8/2007

OTHER PUBLICATIONS

Monrose et al., "Keystroke Dynamics as a Biometric for Authentication," Future Generation Computer Systems, 16, pp. 351-359 (2000).

(Continued)

*Primary Examiner* — Gilberto Barron, Jr.
*Assistant Examiner* — Abdulhakim Nobahar
(74) *Attorney, Agent, or Firm* — Ryan, Mason & Lewis, LLP

(57) ABSTRACT

Methods and apparatus are provided for identity verification for at least one user to a text-based communication. An identity of at least one user to a text-based communication is verified by obtaining a plurality of characteristic features of at least one prior text-based communication between the at least one user and at least one additional user; comparing the plurality of characteristic features to a current session of the text-based communication; and verifying the identity of the at least one user based on a result of the comparison. The text-based communication can optionally be suspended if a user is not verified and/or an alarm can be generated.

24 Claims, 3 Drawing Sheets

(56) References Cited

U.S. PATENT DOCUMENTS

2010/0082800 A1 4/2010 Wei et al.
2011/0016534 A1* 1/2011 Jakobsson et al. .............. 726/28
2012/0084349 A1* 4/2012 Lee et al. ...................... 709/203
2012/0167170 A1* 6/2012 Shi et al. ........................... 726/2
2013/0067546 A1* 3/2013 Thavasi et al. .................... 726/7

OTHER PUBLICATIONS

Anil K. Jain, "Biometric Authentication based on Keystroke Dynamics," http://www.cse.msu.edu/~cse891/Sect601/KeystrokeRcg.pdf (visited May 30, 2009).

* cited by examiner

IDENTITY VERIFICATION FOR AT LEAST ONE PARTY TO A TEXT-BASED COMMUNICATION

FIELD OF THE INVENTION

The present invention relates to instant messaging (IM) and other communication systems, and more particularly, to techniques for validating the identity of participants to a communication.

BACKGROUND

Instant messaging systems provide real-time communication over a network between two or more users employing client devices. Instant messaging systems typically provide an indication of whether a user is online and likely available to receive an instant message in a timely manner. While instant messaging systems offer many benefits, they also present a number of challenges.

For example, while IM systems typically indicate which users in a buddy list are currently logged on to the IM server, the parties to an IM session cannot be sure of the identity of the other party. In other words, even though a particular username may appear in a buddy list, a person other than the actual user may be employing the username. Alternatively, a sender may inadvertently click on the wrong username when initiating a chat session. Either scenario can result in information being sent to an unintended recipient.

A need therefore exists for validating the identity of one or more parties to an IM session.

SUMMARY

Generally, methods and apparatus are provided for identity verification for at least one user to a text-based communication. According to one aspect of the invention, an identity of at least one user to a text-based communication is verified by obtaining a plurality of characteristic features of at least one prior text-based communication between the at least one user and at least one additional user; comparing the plurality of characteristic features to a current session of the text-based communication; and verifying the identity of the at least one user based on a result of the comparison. The text-based communication can optionally be suspended if a user is not verified and/or an alarm can be generated.

The characteristic features can be compared to a current session, for example, using statistical properties of the words entered by the user and/or statistical properties of the dynamics of the user's keystrokes. The characteristic features can be obtained, for example, using machine learning techniques. The characteristic features can be recorded, for example, in at least one feature vector and/or one or more rules.

A more complete understanding of the present invention, as well as further features and advantages of the present invention, will be obtained by reference to the following detailed description and drawings.

DETAILED DESCRIPTION

Aspects of the present invention provide methods and apparatus for validating the identity of one or more parties to an IM session. In this manner, the disclosed IM identity validation techniques can detect if a sender inadvertently clicks on the wrong username when initiating a chat session, or if a person is disguising himself or herself as another user. In this manner, the disclosed IM identity validation techniques can detect, for example, if a user leaves a current chat window unattended and another user enters the conversation with the same username as the absent user.

According to one aspect of the invention, the disclosed IM identity validation techniques validate the identities of both parties based on previous chatting patterns between the chat participants. In this manner, communicating sensitive or confidential information to an unintended recipient can be avoided.

A number of existing IM identity validation techniques present one or more challenges to the user during an IM session. The participants, however, may be annoyed by the challenge questions. According to another aspect of the present invention, the disclosed IM identity validation techniques operate in the background and monitor the chat session relative to prior chatting patterns between the current chat participants. For example, the disclosed IM identity validation techniques observe current word use, keystroke patterns and/or other chat session dynamics and determine if they are consistent with previously observed chatting patterns between the current chat participants. In this manner, the disclosed approach does not require any explicit authenticity challenges and thereby avoids potentially annoying the users with such challenges.

Figure 1:
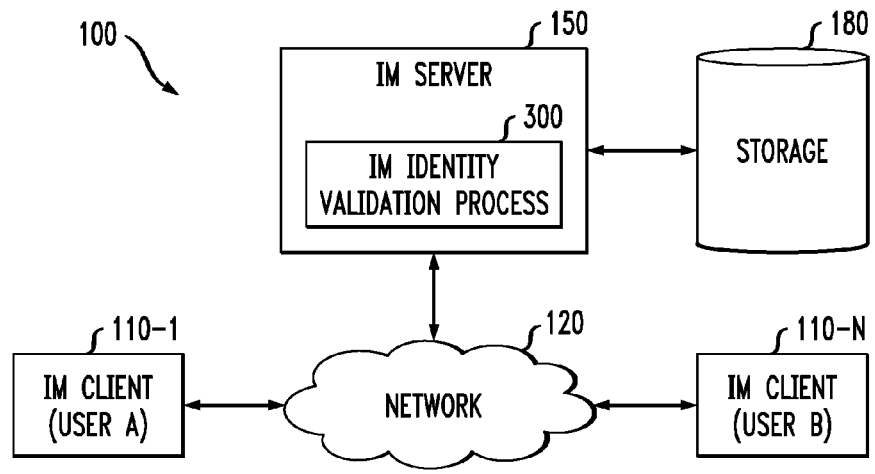
FIG. 1 illustrates an exemplary network environment in which the present invention can operate.

FIG. 1 illustrates an exemplary network environment 100 in which the present invention can operate. As shown in FIG. 1, two or more users employing IM clients 110-1 through 110-N (hereinafter, collectively referred to as IM clients 110) communicate over a network 120, such as the Internet, the Public Switched Telephone Network (PSTN), or any wired or wireless network (or combination thereof). The IM clients 110 are logged in to one or more IM servers 150, in a known manner. As discussed hereinafter, the exemplary IM servers 150 employ an IM identity validation process 300 incorporating aspects of the present invention to validate the identity of one or more parties to an IM session. A storage device 180 optionally stores IM logs between chat participants, as well as feature vectors or other mechanisms for recording the prior chatting patterns between chat participants, as discussed further below in conjunction with FIG. 2.

While the exemplary embodiments are described herein in the context of IM communications, the present invention also applies to other pair-wise text-based communications, such as electronic mail and texting or chat on cellular telephones, as would be apparent to a person of ordinary skill in the art. In addition, the present invention also applies to any text-based communication protocols, including, for example, Internet Relay Chat (IRC) and Short Message Service (SMS) protocols, as would be apparent to a person of ordinary skill in the art. For illustration purposes, the features and functions of the present invention are performed by the exemplary IM server 150. It is noted, however, that the features and functions of the present invention can optionally be employed by one or more IM clients 110, or by another processor or hardware device.

Aspects of the present invention recognize that two-party chatting employs a writing style that is different than a formal writing style. For example, two particular chat participants may utilize patterns, styles and/or keyboard dynamics when they chat with one another that can distinguish the pair-wise communication from communications involving other pairs. As discussed hereinafter, two particular chat participants may employ a distinct vocabulary when chatting with one another (e.g., frequent use of certain words, proper names, terms of endearment and/or nicknames). In addition, the relationship between the two particular chat participants, such as whether they are close friends or colleagues, may lead to certain distinct patterns, styles and/or keyboard dynamics. For example, two particular chat participants may be close friends that chat often, leading to a higher frequency of using slang terms or a more relaxed concern about grammar, punctuation and/or spelling. Likewise, two particular chat participants that are business colleagues may employ frequent acronyms or technical terminology that may only be used by those familiar with a given project.

Additional aspects of the present invention recognize that the keystroke dynamics (e.g., typing speed and other statistical properties) of one or both chat participants can distinguish the pair-wise communication from communications involving other pairs. For example, habitual typing rhythm patterns can be monitored, such as, for example, keystroke latency, keystroke duration and overall typing speed. As used herein, keystroke latencies are the elapsed times between successive keystrokes (e.g., the elapsed time between the release of the first key and the depression of the second). Likewise, the duration of each keystroke is the amount of time a given key is held down. For a more detailed discussion of keystroke dynamics, see, for example, Fabian Monrose and Aviel D. Rubin, "Keystroke Dynamics as a Biometric for Authentication," Future Generation Computer Systems, 16, 351-59 (2000), or Anil K. Jain, "Biometric Authentication based on Keystroke Dynamics," http://www.cse.msu.edu/~cse891/Sect601/KeystrokeRcg.pdf (visited May 30, 2009), each incorporated by reference herein.

The exemplary embodiment employs machine learning techniques to observe the chat sessions between each pair (or larger group chat) of chatting participants. The machine learning techniques characterize particular features that can distinguish the distinct patterns, styles and/or keyboard dynamics of particular pairs of chatting participants. In various implementations, the machine learning techniques can observe, for example, whether a given chat session employs a plurality of languages (for example, using a mixture of Chinese and English in cases of one Chinese speaker chatting with another Chinese speaker), chat duration, as well as indicators such as gender, age, race and nationality that can be ascertained from prior chats.

Figure 2:
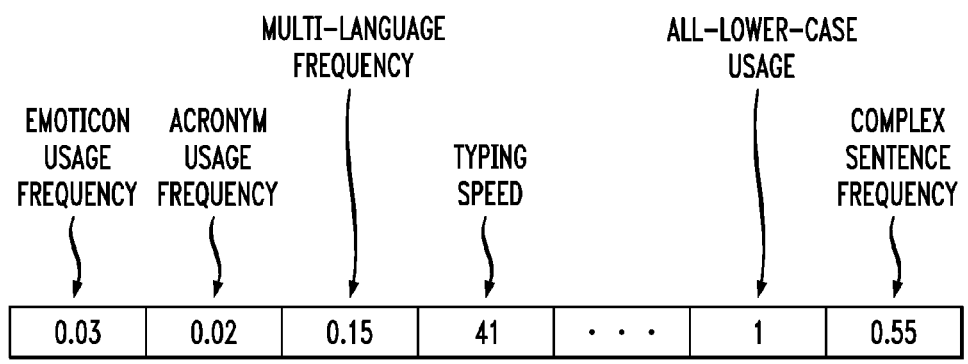
FIG. 2 illustrates an exemplary IM identity validation feature vector between a pair of exemplary chat participants.

FIG. 2 illustrates an exemplary IM identity validation feature vector 200 between a pair of exemplary chat participants A and B. As shown in FIG. 2, the exemplary IM identity validation feature vector 200 comprises the following features: emoticon usage frequency, acronym usage frequency, multi-language usage frequency, typing speed, all lower-case usage (a Boolean-valued feature indicating whether the chat thus far has all been typed in lower case by the given chat participant) and complicated sentence frequency. For example, the presence of emoticon usage in general, and especially certain emoticons, suggests a familiarity between the pair of users. Likewise, the usage of acronyms and multiple languages in a chat session can distinguish particular pairs of chatting participants.

Although some components of the exemplary feature vector 200 could conceivably be Boolean values, expressing these feature vectors as frequencies (e.g., values between 0 and 1) can add precision to the identity authentication process. By watching many previous conversations between the pair of users, there would be a typical range of emoticon usage and acronym usage for each party. If several components of the feature vector for a given conversation start turning up with values outside of the 95% (two standard deviations) confidence range or 99.7% (three standard deviations) confidence range, for example, it may suggest that the person on the other end of the chat is not the person they are thought to be.

Generally, emoticon and acronym usage frequency can be computed, for example, by treating emoticons and acronyms, respectively, as words and computing the fraction of words that are emoticons or acronyms. The multi-language frequency feature may be computed by counting the fraction of sentences that use words from two languages (or from two specific languages). The exemplary typing speed feature may be computed by taking the average number of words per minute typed from the time of the beginning of typing to the end of the message (or end of typing, if, e.g., it can be determined with some degree of likelihood that the typist has been distracted before completing the message). The all-lower-case usage feature, here taken to be a binary value, may be computed by checking whether the user has typed entirely in lower case or not, and finally the exemplary complex sentence frequency feature may be computed by taking the fraction of sentences having more than a total of K words or K' syllables for some suitable values of K and/or K'.

While the exemplary embodiments are described herein using exemplary feature vectors, the present invention also applies to other mechanisms for recording prior chatting patterns between pair-wise chat participants, such as a rule-based mechanism, as would be apparent to a person of ordinary skill in the art.

Figure 3:
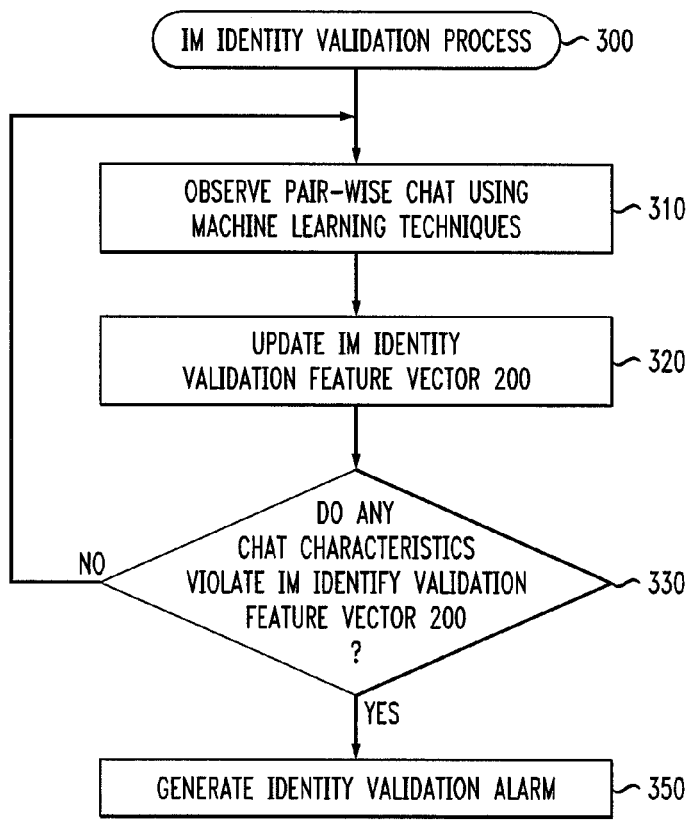
FIG. 3 is a flow chart describing an exemplary implementation of an IM identity validation process incorporating aspects of the present invention.

FIG. 3 is a flow chart describing an exemplary implementation of an IM identity validation process 300 incorporating aspects of the present invention. As shown in FIG. 3, the exemplary IM identity validation process 300 initially employs machine learning techniques during step 310 to observe each pair-wise chat. In this manner, by observing and analyzing chat messages and "keyboard dynamics" in real-time, the IM identity validation process 300 can validate the pair (or more) of participants. For example, standard statistical machine learning techniques can be employed during step 310. For example, the system may have a set of pre-defined features such as {slang frequency, acronym frequency, misspelling frequency} and it may learn from viewing many chats between two chat participants that once at least 100 words of a chat are seen the frequencies for these values, for a given one of the participants, given the presence of the pair chat, are in the range $\{\mu_s \pm 2\sigma_{s,100}, \mu_a \pm 2\sigma_{a,100}, \mu_m \pm 2\sigma_{m,100}\}$, each with probability 95%, where $\{\mu_s, \mu_a, \mu_m\}$ are the means, and $\{\sigma_{s,100}, \sigma_{a,100}, \sigma_{m,100}\}$ are the standard deviations of {slang frequency, acronym frequency, misspelling frequency} given that 100 words of the chat have been seen. Thus if values of two of the features from the current chat fall outside of this range the system can suggest that there is some substantial likelihood the chat participant is not who you think it is. Note that as the number of words, N, increases, the values $\{\sigma_{s,N}, \sigma_{a,N}, \sigma_{m,N}\}$ will tighten and the system will be in a better position to make recommendations about the identity (or lack of identity) of a chat participant.

It is noted that in some cases there may not be a chat history for a given pair of chat participants. In this event, the IM identity validation process 300 can optionally verify that the chatting pattern of the individual initiating the chat matches the accustomed vocabulary and dynamics for this individual (e.g., with other participants). A number of keyboard dynamics of a given individual, such as the keystroke latency and duration, will be statistically similar regardless of who the given individual is chatting with.

Based on the observations of the machine learning techniques, the IM identity validation process 300 updates (or creates) the IM identity validation feature vector 200 during step 320.

A test is performed during step 330, to determine if any observed chat characteristics violate the IM identity validation feature vector 200. If it is determined during step 330 that the observed chat characteristics do not violate IM identity validation feature vector 200, then program returns to step 310 and continues in the manner described above (until the chat session is terminated).

If, however, it is determined during step 330 that one or more observed chat characteristics violate IM identity validation feature vector 200, then the IM identity validation process 300 generates an identity validation alarm during step 350. In one exemplary embodiment, if both participants ignore the warning, the chat conversation can continue. Alternatively, one participant may question the other participant, and if satisfied, the conversation can continue. The new pattern of usage is optionally added to the IM identity validation feature vector 200 for this pair.

In a further variation, a confidence score can optionally be provided. For example, given a set of principle features (as determined, e.g. using well-known Principal Component Analysis statistical methods, described, for example, in K. Pearson, "On Lines and Planes of Closest Fit to Systems of Points in Space," Philosophical Magazine 2 (6): 559-572 (1901)) and the null hypothesis that one of the chat parties is who they are supposed to be, the system can display the likelihood that the feature frequencies should fall within the currently observed ranges, given the amount of data (i.e. number of words) that have been seen.

In this manner, the IM identity validation process 300 can verify that various features of the current chat session are consistent with prior patterns for this pair of chat participants. As previously indicated, the IM identity validation process 300 optionally evaluates word usage, misspelling incidence, slang incidence, keystroke dynamics, and other chat characteristics captured by the IM identity validation feature vector 200.

Exemplary Chatting Patterns

The following are illustrative examples of distinguishing patterns in chatting sessions between a pair of exemplary chat participants A and B.

A knows B's wife. B's wife's proper name appears in the conversation of A and B;

B is a high level manager or a highly respected person. A carefully chooses the proper words, avoids spelling/grammar mistakes, and takes a longer time to type;

A and B know each other very well. A and/or B use shorter or simpler words and more icons, emoticons and/or slang speech; and A is a well-educated person and uses longer words, more sophisticated sentence structures.

Hardware and Software Details

While FIG. 3 shows an exemplary sequence of steps, it is also an embodiment of the present invention that these sequences may be varied. Various permutations of the algorithms are contemplated as alternate embodiments of the invention.

While exemplary embodiments of the present invention have been described with respect to processing steps in a software program, as would be apparent to one skilled in the art, various functions may be implemented in the digital domain as processing steps in a software program, in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
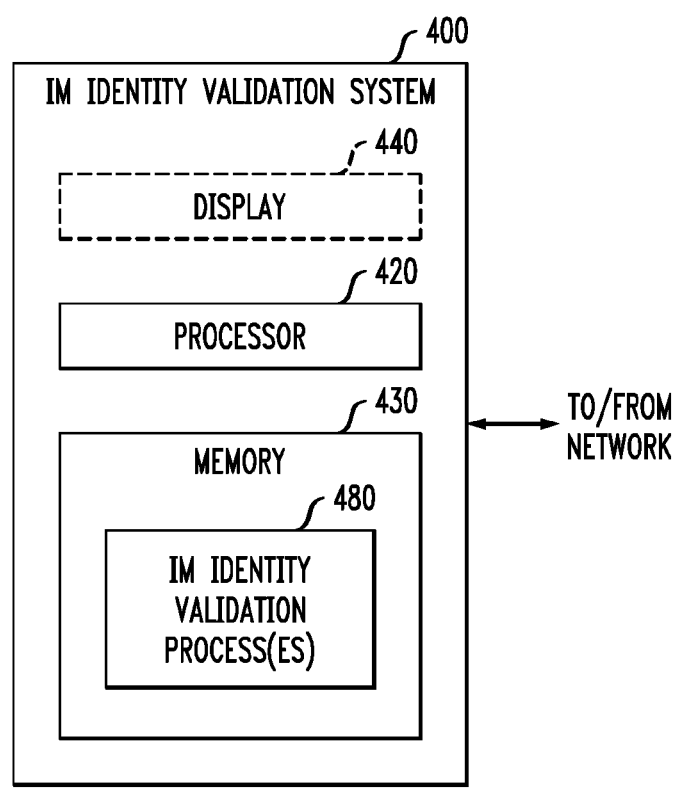
FIG. 4 is a block diagram of an IM identity validation system that can implement the processes of the present invention.

FIG. 4 is a block diagram of an IM identity validation system 400 that can implement the processes of the present invention. As shown in FIG. 4, memory 430 configures the processor 420 to implement the IM identity validation methods, steps, and functions disclosed herein (collectively, shown as 480 in FIG. 4). The memory 430 could be distributed or local and the processor 420 could be distributed or singular. The memory 430 could be implemented as an electrical, magnetic or optical memory, or any combination of these or other types of storage devices. It should be noted that each distributed processor that makes up processor 420 generally contains its own addressable memory space. It should also be noted that some or all of computer system 200 can be incorporated into a personal computer, laptop computer, handheld computing device, application-specific circuit or general-use integrated circuit.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the embodiments and variations shown and described herein are merely illustrative of the principles of this invention and that various modifications may be implemented by those skilled in the art without departing from the scope and spirit of the invention.

What is claimed is:

1. An apparatus for verifying an identity of at least one user to a text-based communication with at least a second user, comprising:
    a memory; and
    at least one hardware device, coupled to the memory, operative to:
    obtain a plurality of pair-wise characteristic features of at least one prior pair-wise text-based communication between said at least one user and said same second user;
    compare the plurality of obtained pair-wise characteristic features to corresponding pair-wise features of a current session of said pair-wise text-based communication between said at least one user and said same second user; and
    verify said identity of said at least one user based on a result of said comparison.

2. The apparatus of claim 1, wherein the plurality of pair-wise characteristic features are compared to said current session using the statistical properties of the words entered by the at least one user.

3. The apparatus of claim 1, wherein the plurality of pair-wise characteristic features are compared to a said current session using the statistical properties of the dynamics of user keystrokes.

4. The apparatus of claim 1, wherein said pair-wise text-based communication comprises one or more of instant messaging, text messaging and electronic mail.

5. The apparatus of claim 1, wherein said plurality of pair-wise characteristic features are obtained using machine learning techniques.

6. The apparatus of claim 1, wherein said at least one hardware device is further configured to observe said pair-wise text-based communication between said at least one user and said second user using machine learning techniques to determine said plurality of characteristic features.

7. The apparatus of claim 1, wherein said plurality of pair-wise characteristic features are recorded in at least one feature vector.

8. The apparatus of claim 7, wherein said at least one hardware device is further configured to update said at least one feature vector.

9. The apparatus of claim 1, wherein said plurality of pair-wise characteristic features are recorded in one or more rules.

10. The apparatus of claim 1, wherein said at least one hardware device is further configured to suspend said pair-wise text-based communication if said at least one user is not verified.

11. The apparatus of claim 1, wherein said at least one hardware device is further configured to generate an alarm if said at least one user is not verified.

12. The apparatus of claim 1, wherein said at least one hardware device is further configured to generate a confidence score that is used to verify said identity.

13. An article of manufacture for verifying an identity of at least one user to a text-based communication with at least a second user, comprising a tangible machine readable storage medium containing one or more programs which when executed implement the steps of:
   obtaining a plurality of pair-wise characteristic features of at least one prior pair-wise text-based communication between said at least one user and said same second user;
   comparing the plurality of obtained pair-wise characteristic features to corresponding pair-wise features of a current session of said pair-wise text-based communication between said at least one user and said same second user; and
   verifying said identity of said at least one user based on a result of said comparison.

14. A method for verifying an identity of at least one user to a text-based communication with at least a second user, comprising:
   obtaining a plurality of pair-wise characteristic features of at least one prior pair-wise text-based communication between said at least one user and said same second user;
   comparing the plurality of obtained pair-wise characteristic features to corresponding pair-wise features of a current session of said pair-wise text-based communication between said at least one user and said same second user; and
   verifying said identity of said at least one user based on a result of said comparison, wherein at least one of said comparing and verifying steps are performed by at least one hardware device.

15. The method of claim 14, wherein the comparing step uses the statistical properties of the words entered by the at least one user.

16. The method of claim 14, wherein the comparing step uses the statistical properties of the dynamics of user keystrokes.

17. The method of claim 14, wherein said pair-wise text-based communication comprises one or more of instant messaging, text messaging and electronic mail.

18. The method of claim 14, wherein said plurality of pair-wise characteristic features are obtained using machine learning techniques.

19. The method of claim 14, further comprising the step of observing said pair-wise text-based communication between said at least one user and said second user using machine learning techniques to determine said plurality of pair-wise characteristic features.

20. The method of claim 14, wherein said plurality of pair-wise characteristic features are recorded in at least one feature vector.

21. The method of claim 20, further comprising the step of updating said at least one feature vector.

22. The method of claim 14, wherein said plurality of pair-wise characteristic features are recorded in one or more rules.

23. The method of claim 14, further comprising the step of suspending said pair-wise text-based communication if said at least one user is not verified.

24. The method of claim 14, further comprising the step of generating an alarm if said at least one user is not verified.

* * * * *